United States Patent
Cyrille et al.

(10) Patent No.: US 7,237,321 B2
(45) Date of Patent: *Jul. 3, 2007

(54) METHOD FOR FABRICATING A CPP MAGNETIC TRANSDUCER USING CMP-ASSISTED LIFT-OFF AND A CMP-RESISTANT METAL LAYER

(75) Inventors: Marie-Claire Cyrille, San Jose, CA (US); Frederick Hayes Dill, South Salem, NY (US); Jui-Lung Li, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 398 days.

This patent is subject to a terminal disclaimer.

(21) Appl. No.: 10/909,121

(22) Filed: Jul. 30, 2004

(65) Prior Publication Data

US 2006/0023377 A1 Feb. 2, 2006

(51) Int. Cl.
 *G11B 5/127* (2006.01)
 *H04R 31/00* (2006.01)
(52) U.S. Cl. ............................... 29/603.13; 29/603.07; 29/603.15; 29/603.16; 29/603.18; 216/22; 216/65; 360/122; 360/126; 360/317; 360/324.11; 427/127; 427/128; 451/5; 451/29; 451/41; 451/57; 451/60

(58) Field of Classification Search ............. 29/603.07, 29/603.13–603.16, 603.18; 216/22, 65; 360/122, 360/126, 317, 324.11; 427/127, 128; 451/5, 451/29, 41, 57, 60
See application file for complete search history.

(56) References Cited

U.S. PATENT DOCUMENTS

| | | | |
|---|---|---|---|
| 6,353,318 B1 * | 3/2002 | Sin et al. | 324/252 |
| 6,381,107 B1 | 4/2002 | Redon et al. | |
| 6,554,878 B1 | 4/2003 | Dill et al. | |
| 6,576,113 B1 | 6/2003 | Scherer et al. | |
| 6,583,957 B1 | 6/2003 | Takeshita et al. | |
| 6,669,983 B2 | 12/2003 | Kagami et al. | |
| 7,094,130 B2 * | 8/2006 | Cyrille et al. | 451/29 |
| 2002/0034043 A1 | 3/2002 | Okada | |
| 2003/0168627 A1 | 9/2003 | Singh et al. | |
| 2003/0219626 A1 | 11/2003 | Partee | |

OTHER PUBLICATIONS

Spallas, et al., "Perpendicular current giant magnetoresistance in 0.4 micron diameter Co-Cu multilayer sensors", IEEE Trans. Magnetics, vol. 32, No. 5, Sep. 1996, pp. 4710-4712.

* cited by examiner

*Primary Examiner*—Paul D Kim
(74) *Attorney, Agent, or Firm*—G. Marlin Knight

(57) ABSTRACT

A method is described which uses a CMP resistant metal layer to replace the upper dielectric layer in the track width definition phase of a TMR or CPP spin valve magnetic head. The metal which is selected to be resistant to the CMP process can be rhodium (Rh), platinum (Pt), chromium (Cr), vanadium (V), etc. The additional CMP resistance of the refill layer structure provides a much larger processing window which results in higher yields. A CPP head according to the invention has a metal layer according to the invention above the hard bias structures on the sides of the sensor which define the track width.

6 Claims, 4 Drawing Sheets

METHOD FOR FABRICATING A CPP MAGNETIC TRANSDUCER USING CMP-ASSISTED LIFT-OFF AND A CMP-RESISTANT METAL LAYER

FIELD OF THE INVENTION

The invention relates to the field of thin film device fabrication and more particularly to methods, materials and structures used to fabricate a magnetic sensor for magnetic transducers used in data storage devices; and even more particularly, the invention relates methods, materials and structures used in combination with CMP processes during the fabrication of CPP magnetic sensors.

BACKGROUND OF THE INVENTION

The read and write head portions of the slider for use in a typical prior art magnetic disk recording system are built-up in layers using thin film processing techniques. Typically the read head is formed first, but the write head can also be fabricated first. The conventional write head is inductive and the read sensor is magnetoresistive. In the typical process of fabricating thin film magnetic transducers, a large number of transducers are formed simultaneously on a wafer. After the basic structures are formed the wafer is cut into rows or individual transducers.

The magnetic sensor can be any one of various types including tunnel-junction (TMR) and spin valves. In TMR and some spin valves designs the current in the sensor flows perpendicular to the film (CPP). The fabrication problems for TMR and CPP spin valves sensors are different than for those where current flows in the plane of the film (CIP). FIG. 1 illustrates selected components in a TMR head 10 as viewed from the ABS. In CPP sensors the lower electrical lead 22 is also the magnetic shield S1. The upper electrical lead 23 is also the magnetic shield S2. The hard bias layer structure 16 which conventionally abuts the sensor must be electrically insulated from the sensor and the S1 shield. The hard bias structures are, therefore, sandwiched between two dielectric layers such as alumina 15, 17. The section of the head shown in FIG. 1 is along the plane which will become the air-bearing surface after further processing. The track centerline is shown on the ABS passing over the sensor structure perpendicular to the plane of the thin films. The ABS is exposed after the fabrication of the thin film structures by cutting the wafer.

Lift-off patterning is a general process that is used to define structures on the surface of a wafer. The lift-off process typically involves the deposition of resist material, followed by a sequence of other processes, including exposure, development, metal or dielectric deposition, and subsequent removal of the resist protective layer along with the unwanted materials deposited on top of the resist, in order to pattern a structure on a substrate. A CMP-assisted lift-off process uses a slurry with abrasive particles assisted by a low-pressure chemical mechanical polishing technique. The typical CMP lift-off slurry also includes surfactants, stabilizers, corrosion inhibitors and has preferably an alkaline pH.

FIG. 2 illustrates a section of wafer 11 on which a plurality of partially completed CPP magnetic heads are being manufactured according to the prior art. The phase of the fabrication process represented in FIG. 2 is when the track width of the sensor structure 14 is defined, i.e., the width of sensor structure perpendicular to the track centerline. The sensor 14 and diamond-like carbon (DLC) layer 63 have been deposited and patterned and the refill materials which form the structures at the sides of the sensor have been deposited. Since multiple materials are used in this refilling process, it is referred to as a "refill stack." The first layer of the refill stack is a dielectric such as alumina 15. The hard bias structure 16 in this example consists of three layers: chromium (Cr), a hard ferromagnetic material and tantalum (Ta). The hard bias structure 16 is followed by a second dielectric layer such as alumina 17. A thin tantalum layer 18 and a DLC layer 19 complete the layers at the selected state of the process. The portion of the dielectric layer 15 deposited on the side of sensor 14 is critical since it acts to insulate the electrically conductive hard bias materials from the sensor. After the refill materials have been deposited, a chemical-mechanical polishing (CMP) is used to lift-off the photoresist (not shown) and the unneeded portions deposited films. The prior art CMP process has been partially executed in FIG. 2 to illustrate the initial stages of damage that can occur during the process. The DLC and Ta layers at the edge of the sensor have failed in that they have been completely removed when they ideally should survive the CMP. The DLC is intended to be CMP resistant, but can fail. The failure of the DLC layer results in the erosion of the edges of the upper dielectric 17, the hard bias structure 16 and the lower dielectric 15 since they are relatively fragile. In FIG. 3 the areas 26A, 26B next to the sensor 14 illustrates more severe damage that can occur during the CMP process where the lower dielectric layer 15 has been eroded exposing the side surface of the sensor 14 which means that the head will be defective. The process window in the prior art for the CMP lift-off process after deposition of the refill stack is too small for reliable, high yield manufacturing and results in frequent damage to critical structures next to the sensor.

What is needed is an improved method of fabricating the structures on the sides of the CPP sensor.

SUMMARY OF THE INVENTION

An embodiment of a method according to the invention uses a metal layer to replace the upper dielectric layer in the track width definition phase of a TMR or CPP spin valve magnetic head. The metal which is selected to be resistant to the CMP process can be rhodium (Rh), platinum (Pt), chromium (Cr), vanadium (V), etc. The additional CMP resistance of the refill layer structure provides a much larger processing window which results in higher yields. In a method according to the invention a CPP sensor structure width is defined according to the prior art by patterning a photoresist to protect the selected area of the sensor structure and removing excess sensor material at left and right sides of the sensor structure to form voids at the sides of the sensor structure to define the track width. The first dielectric material is deposited over the wafer. This dielectric will be deposited into the voids and onto to the exposed sides of the sensor structure. The layers for a hard bias structure are deposited onto the dielectric material. Next a CMP-resistant metal selected from the group consisting of rhodium, chromium, vanadium and platinum is deposited onto the hard bias structure. One or more layers for a CMP resistant mask and optionally an adhesion layer are deposited over the CMP-resistant metal. The CMP resistant mask can include an adhesion layer such as tantalum followed by a DLC layer. The CMP-assisted liftoff of the photoresist and the excess materials is executed at this point. The CMP resistant mask is removed after completion of the CMP process, but the CMP resistant metal is left as part of the sensor structure.

The fabrication of the head continues at this point according to the prior art including the formation of the upper shield (S2) which is also the upper electrical lead. A CPP head according to the invention has a metal layer according to the invention above the hard bias structures on the sides of the sensor which define the track width.

DETAILED DESCRIPTION OF THE INVENTION AND THE PREFERRED EMBODIMENTS

Figure 1:
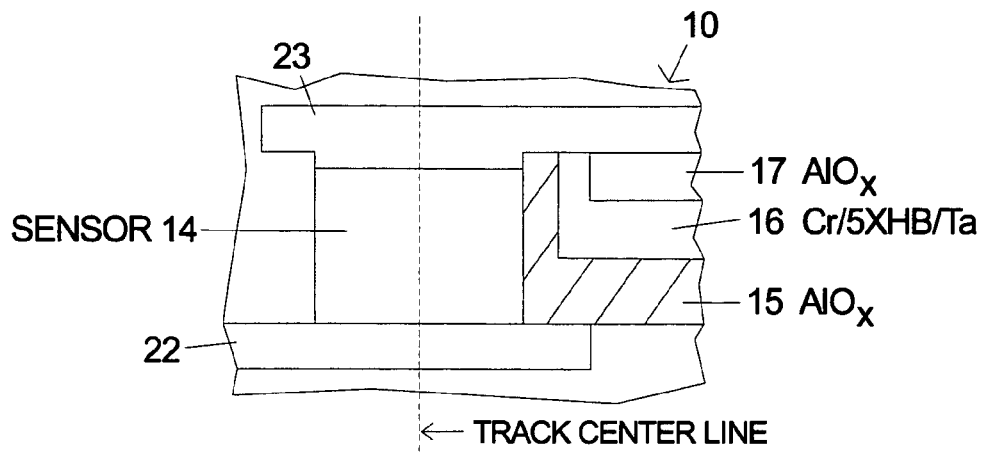
FIG. 1 is an illustration of selected structures of a prior art TMR magnetic head as viewed from the ABS.
Figure 2:
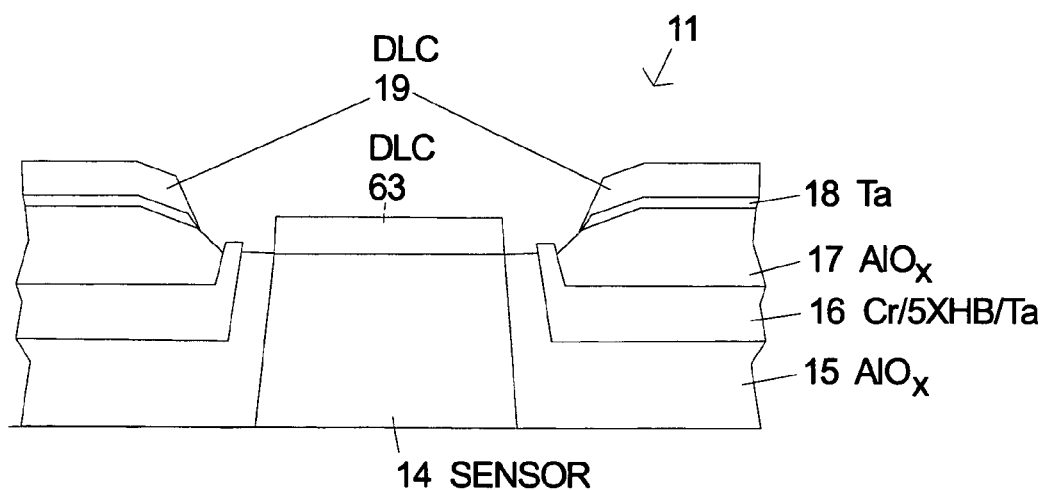
FIG. 2 is an illustration of a section of a wafer on which CPP magnetic heads after being manufactured according to the prior art after a prior art CMP process has been executed and damage has occurred to the DLC layer and structures at the side of the sensor. The section is taken perpendicular to the surface of the wafer and the plane of the thin films. The phase of the process illustrated is defining the track width of the sensor.
Figure 3:
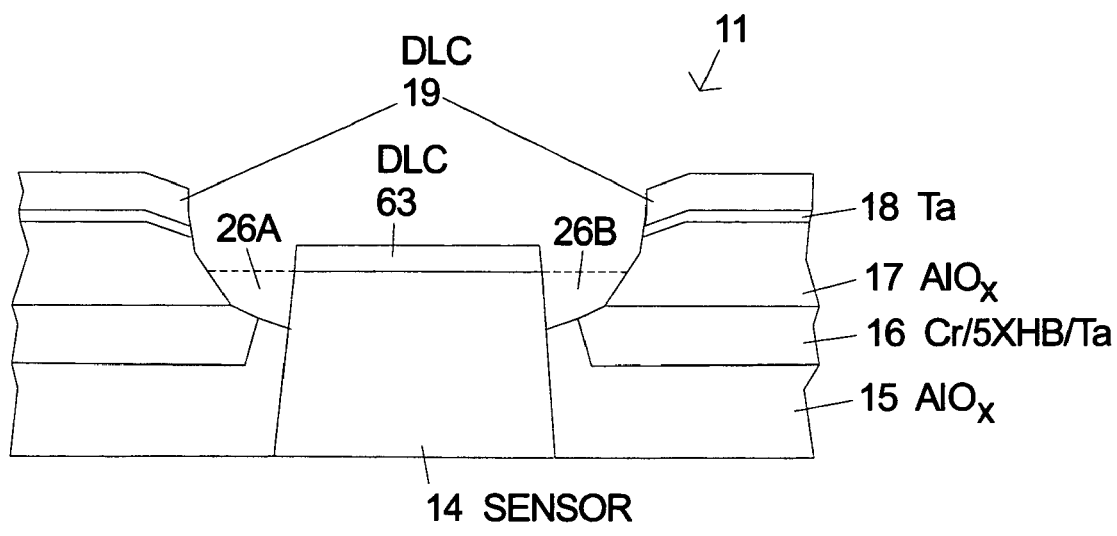
FIG. 3 is an illustration of a section of the wafer of FIG. 2 after further prior art CMP has been executed and damage has occurred to the structures at the side of the sensor. The section is taken perpendicular to the surface of the wafer and the plane of the thin films. The phase of the process illustrated is defining the track width of the sensor.
Figure 4:
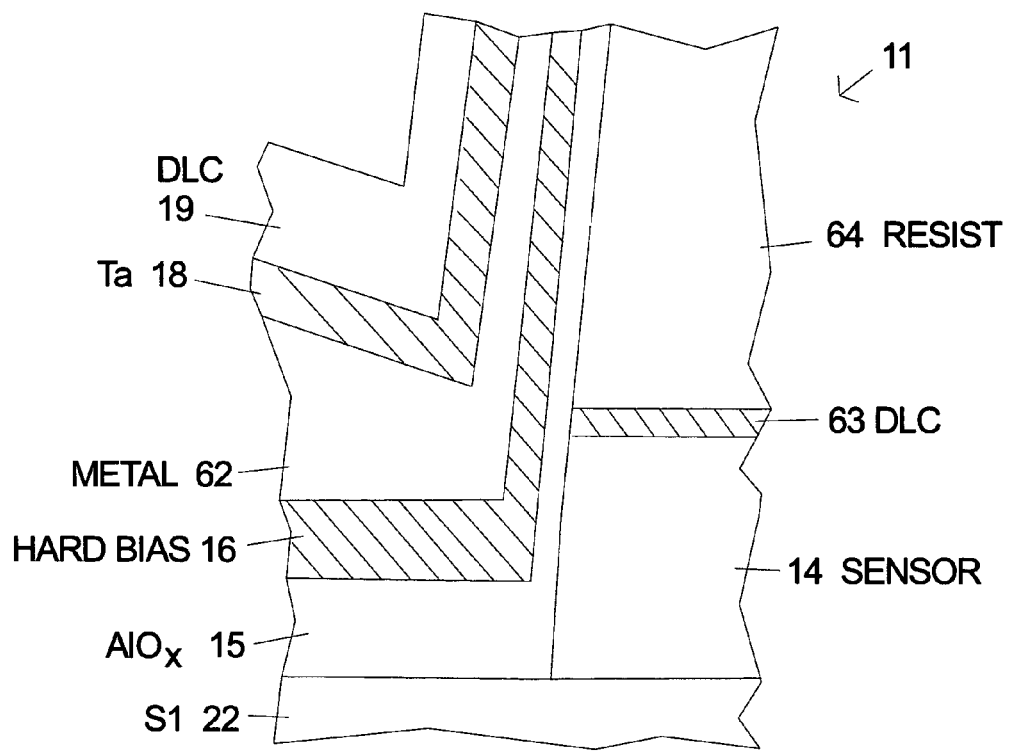
FIG. 4 is an illustration of a section of a wafer being processed according to the invention. The section is taken perpendicular to the surface of the wafer and the plane of the thin films. The phase of the process illustrated is defining the track width of the sensor before CMP.
Figure 5:
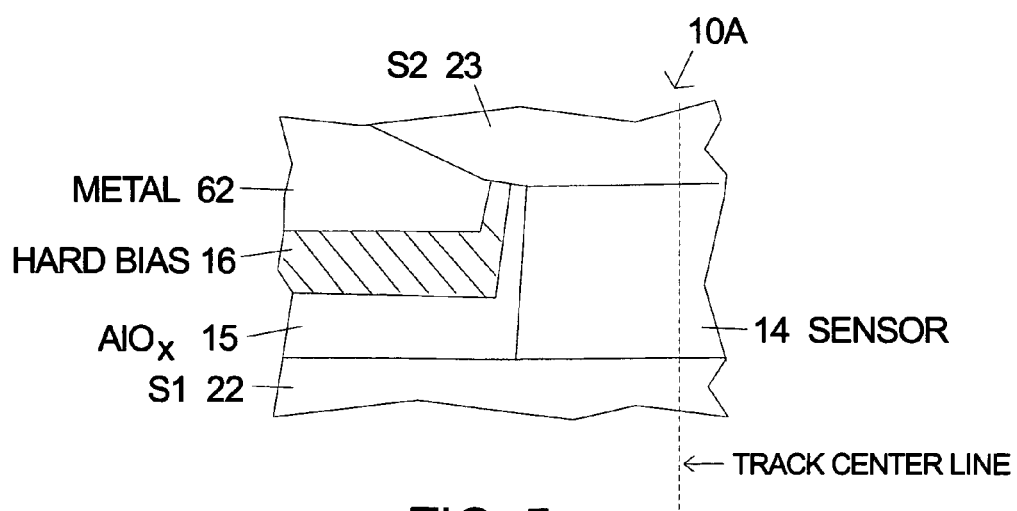
FIG. 5 is an illustration of a section of a completed magnet head which includes the CMP resistant metal layer structure according to the invention.

FIG. 4 is an illustration of a section of a wafer 11 on which thin film magnetic heads are being fabricated according to the invention. The section is taken perpendicular to the surface of the wafer and the plane of the thin films. Typically a large number of heads or other devices are fabricated simultaneously on a wafer. The discussion below illustrates the method of the invention for a single head, but any number of heads can be fabricated simultaneously with the invention. The sensor 14 is shown as a single layer for convenience; however, sensors have a plurality of layers. The details of the substructure of the sensor are outside of the scope of the invention and are according to the prior art. In CPP sensors such as a TMR, the lower electrical lead 22 is also the magnetic shield S1. The upper electrical lead is also a magnetic shield S2 but has not been formed at this stage of the process. The hard bias layer structure 16 which conventionally abuts the sensor must be electrically insulated from the sensor and the S1 shield. The hard bias structures are, therefore, insulated from the sensor structure by the sidewall portion of dielectric layer 15 which is typically alumina. The section of the head shown in FIG. 4 is along the plane which will become the air-bearing surface after further processing. The phase of the fabrication process represented in FIG. 4 is when the track width of the sensor 14 is defined. The sensor 14 has been deposited and patterned using photoresist 64 and the refill materials which form the structures at the sides of the sensor have been deposited. The first layer of the refill stack is a dielectric such as alumina 15 as in the prior art. The hard bias structure 16 can be any one the several hard bias structures known in the prior art. As an example one possible combination consists of three layers: chromium (Cr), a hard ferromagnetic material and tantalum (Ta) as in the prior art. Any other hard bias structure can be used with the invention as well. The hard bias structure 16 is followed by a metal layer 62 according to the invention. The metal layer 62 is deposited to the same thickness as the prior art dielectric layer. The subsequent CMP resistant mask layers are according to the prior art and can be different from the ones shown without affecting the invention. For example, a thin tantalum layer 18 is typically used as an adhesion layer for the diamond-like carbon (DLC) layer 19 which is used as a CMP resistant layer at the selected state of the process.

The invention replaces the prior art dielectric layer on top of the hard bias structure 16 with a CMP resistant metal. The invention provides additional protection during the CMP process for the critical structures adjacent to the sensor. Even when the DLC layer 19 is damaged during CMP the metal layer 62 covers the sides of the hard bias structure 16 and the first dielectric 15 and acts to slow down the erosion of the materials at the side of the sensor 14. When a prior art CMP process is executed on the refill structure including the metal layer 62, a longer acceptable processing window is opened up and the result is a higher yield from the manufacturing line.

The metal for the layer 62 according to the invention is selected empirically for its property of resisting the CMP used for the lift-off at the track width definition phase of the process. CMP removal rates for various metals can be determined by depositing full film samples and then measuring the rate of removal during a particular CMP. In the particular tests performed by the applicants, an alkaline slurry was used. The preferred metal according to these tests is rhodium (Rh). But platinum (Pt), chromium (Cr) and vanadium (V) also have sufficient CMP resistance to be beneficial.

Figure 6:
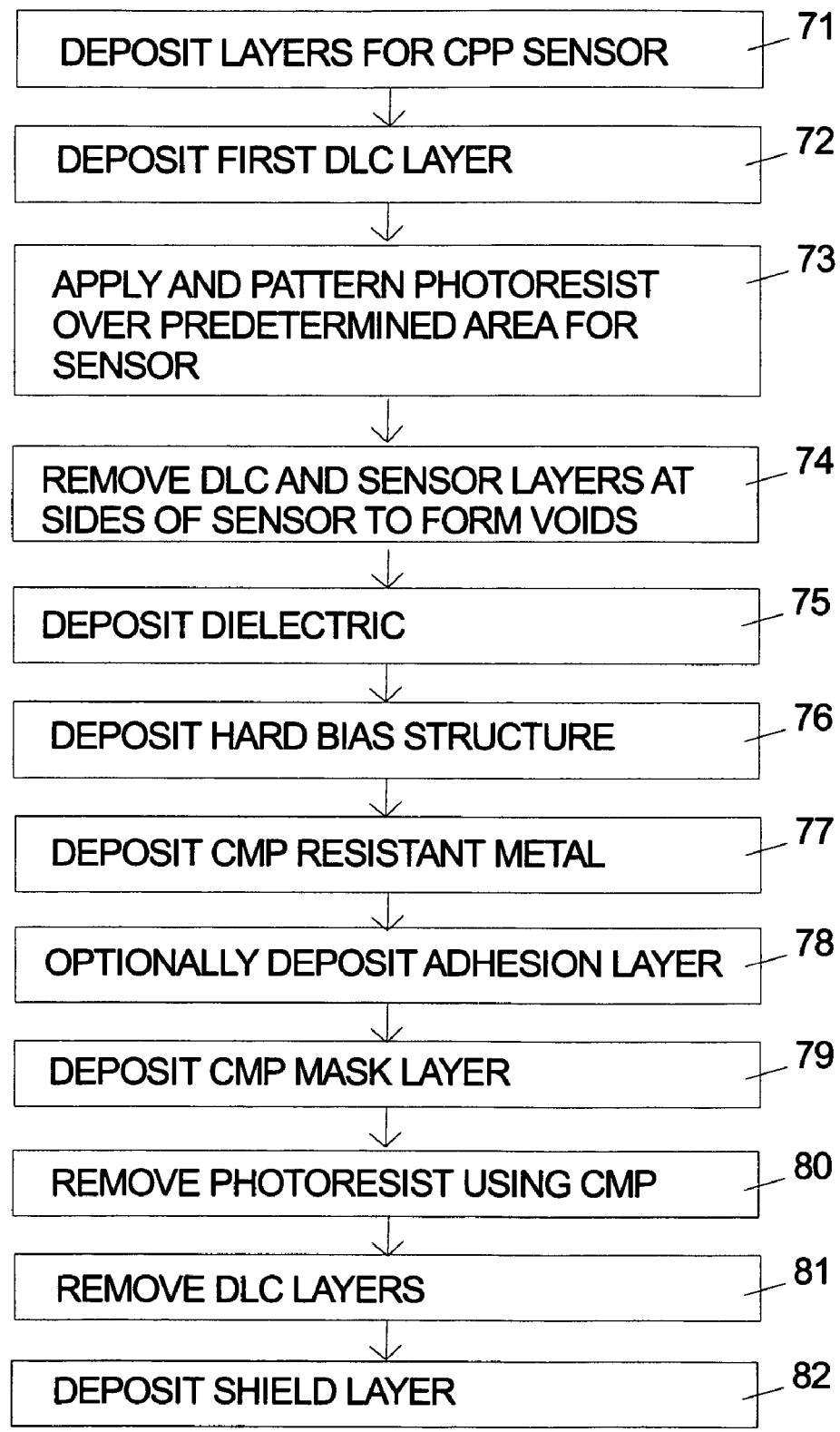
FIG. 6 is a flowchart of an embodiment of a method according to the invention.

FIG. 6 is a flowchart of an embodiment of a method according to the invention. The plurality of layers for the CPP sensor structure are deposited according to the prior art 71. Preferably a DLC layer 63 is deposited over the sensor structure 72. A photoresist 64 is patterned to protect the selected area of the sensor structure along the dimension which will become the width of the sensor 73. A CPP sensor structure width is defined by removing the DLC layer and excess sensor material at left and right sides of the sensor structure to form voids at the left and right sides of the sensor structure to define the track width 74. The first dielectric material 16 is deposited over the wafer 75. This dielectric will be deposited into the voids and onto to the exposed sides of the sensor structure, as well as the photoresist. The layers for a hard bias structure 16 are deposited onto the dielectric material 76. Next a CMP-resistant metal selected from the group consisting of rhodium, chromium, vanadium and platinum is deposited onto the hard bias structure 77. Optionally an adhesion layer is deposited 78. One or more layers for a CMP resistant mask are deposited over the CMP-resistant metal 79. The CMP-assisted liftoff of the photoresist and the excess materials is executed at this point 80. An abrasive slurry with an alkaline pH is preferred. The CMP resistant mask 19 and the DLC layer 63 are removed after completion of the CMP process 81, but the CMP resistant metal is left as part of the sensor structure. The fabrication of the head continues at this point according to the prior art including the formation of the upper shield (S2) which is also the upper electrical lead 82.

The relative dimensions of the films and structures of the magnetic head are according to the prior art. As an example, a head according to the invention could have a sensor structure about 50 nm thick with the first dielectric 15 being about 25 nm. The hard bias structure 16 would be about 25 nm and the CMP resistant metal layer 62 would be about 30 nm.

Although the embodiments of the invention have been described in particular embodiments those skilled in the art will recognize that the invention may be used in other embodiments where similar conditions exist.

The invention claimed is:

1. A method of fabricating thin film magnetic heads on a wafer comprising the steps of:
    patterning a photoresist over a predetermined CPP sensor structure;
    forming the CPP sensor structure width by removing excess sensor material around the photoresist at left and right sides of the sensor structure to form voids at the left and right sides of the sensor structure;
    depositing a dielectric material into the voids;
    depositing one or more layers for a hard bias structure into the voids onto the dielectric material;
    depositing a CMP-resistant metal onto the hard bias structure;
    depositing one or more layers for a CMP resistant mask over the CMP-resistant metal; and
    removing the photoresist by a process which includes chemical-mechanical polishing (CMP).

2. The method of claim 1 wherein the CMP resistant metal is selected from the group consisting of rhodium, chromium, vanadium and platinum.

3. The method of claim 2 wherein an alkaline slurry is used for the CMP.

4. The method of claim 2 wherein a DLC layer is deposited over the sensor structure prior to the step of patterning the photoresist.

5. The method of claim 4 further comprising the step of removing the DLC after removing the photoresist.

6. The method of claim 5 further comprising the step of fabricating a magnetic shield over the sensor structure after removing the DLC.

* * * * *